(12) United States Patent
De Bast et al.

(10) Patent No.: US 7,322,259 B2
(45) Date of Patent: Jan. 29, 2008

(54) SAFETY CYCLE PEDAL

(75) Inventors: Jean-Francois De Bast, Montferrat (FR); Alain Plassiard, La Murette (FR)

(73) Assignee: Time Sport International, Varennes Vauzelles (FR)

( * ) Notice: Subject to any disclaimer, the term of this patent is extended or adjusted under 35 U.S.C. 154(b) by 331 days.

(21) Appl. No.: 10/758,255

(22) Filed: Jan. 16, 2004

(65) Prior Publication Data
US 2004/0154432 A1    Aug. 12, 2004

(30) Foreign Application Priority Data
Jan. 17, 2003   (FR)   ................... 03 00493

(51) Int. Cl.
*G05G 1/14*   (2006.01)
*A43B 5/14*   (2006.01)

(52) U.S. Cl. ...................... 74/594.6; 36/131

(58) Field of Classification Search ............. 74/594.6, 74/594.4; 267/273, 277; 36/131
See application file for complete search history.

(56) References Cited

U.S. PATENT DOCUMENTS

| 5,031,263 | A | * | 7/1991 | Babb et al. | ............... | 15/104.33 |
| 5,195,397 | A | * | 3/1993 | Nagano | ...................... | 74/594.4 |
| 5,417,128 | A | * | 5/1995 | Beyl | ......................... | 74/594.6 |
| 6,012,356 | A | * | 1/2000 | Ueda | .......................... | 74/594.6 |
| 6,196,084 | B1 | * | 3/2001 | Ueda | .......................... | 74/594.6 |
| 6,230,583 | B1 | | 5/2001 | Ohno | | |
| 6,282,984 | B1 | * | 9/2001 | Chen | .......................... | 74/594.6 |
| 6,374,699 | B1 | | 4/2002 | Peyre | | |
| 6,536,304 | B2 | * | 3/2003 | Peyre | ......................... | 74/594.6 |
| 6,908,159 | B2 | * | 6/2005 | Prince et al. | ........... | 297/452.23 |
| 2002/0050773 | A1 | * | 5/2002 | Reis | ....................... | 312/334.46 |
| 2002/0066337 | A1 | * | 6/2002 | Bryne | ........................ | 74/594.6 |
| 2002/0170382 | A1 | | 11/2002 | Yang | | |
| 2003/0029271 | A1 | * | 2/2003 | Shuman | ..................... | 74/594.6 |

FOREIGN PATENT DOCUMENTS

| EP | 0424210 | 4/1991 |
| EP | 0572291 | 1/1993 |
| EP | 0 999 122 | 5/2000 |
| FR | 2809701 | 12/2001 |
| FR | 002809701 | * 12/2001 |
| FR | 2822127 | 9/2002 |
| FR | 2822433 | 9/2002 |

* cited by examiner

*Primary Examiner*—Richard Ridley
*Assistant Examiner*—Terence Boes
(74) *Attorney, Agent, or Firm*—Connolly Bove Lodge & Hutz, LLP

(57) ABSTRACT

A cycle pedal includes a pedal body mounted to rotate about a pedal spindle, a front hoop having a front attachment bar situated in front of the pedal spindle and substantially parallel to the spindle, and a rear hoop having a rear attachment bar situated behind the pedal spindle and substantially parallel to the spindle. The rear hoop is articulated about a first hoop spindle mounted in bearings of the pedal body and elastic means are provided to urge the rear hoop toward a rest position. The front hoop is articulated about a second hoop spindle which is situated below the mid-plane of the pedal, on a side opposite to the front attachment bar, and elastic means are provided to urge the front hoop toward a rest position. The front upper part of the pedal body is inclined downward toward the front, thereby allowing a greater angular range for a user to click into the pedal.

10 Claims, 3 Drawing Sheets

SAFETY CYCLE PEDAL

The invention relates to a safety cycle pedal, also called an automatic pedal, of the type which comprises a body mounted to rotate about a pedal spindle with:
- a front hoop comprising an attachment bar situated in front of the pedal spindle and substantially parallel to this spindle,
- a rear hoop comprising an attachment bar situated behind the pedal spindle and substantially parallel to this spindle, the rear hoop being articulated about a first hoop spindle mounted in bearings of the pedal body,
- elastic means urging the rear hoop toward a rest position,
- the attachment bars being situated above the pedal body and being able to be moved apart in order to allow the passage and attachment of a cleat fixed under the sole of a cycle shoe in a housing of the sole, at least one edge of which is limited by a projection, especially a stud, whose thickness is generally greater than that of the cleat.

The terms "front" and "rear" are to be understood as following the direction of travel of a bicycle equipped with the pedal in question. The expression "above the pedal body" is to be understood as referring to a substantially horizontal pedal positioned with the front hoop placed in front of the pedal spindle.

Cycle pedals of this kind are known, in particular from EP 0 424 210 and EP 0 572 291. Such pedals allow the user to attach the shoe to the pedal essentially by pressing the foot onto the pedal, causing the hoops to move apart for the passage and attachment of the cleat to the bars. The release of the shoe is achieved by a simple twisting movement of the foot, generally by disengaging the heel toward the outside of the bicycle.

The operation of these pedals as far as the attachment of the cleat is concerned is particularly reliable, even if the cyclist has walked on fairly wet ground or in mud which has become stuck under the sole and/or around the cleat. The projection or projections located under the sole, especially in the form of studs, with a thickness greater than that of the cleat make it possible, when walking on hard ground, to avoid contact between the cleat, which may be made of metal, and the ground.

The known pedals are satisfactory, but it is desirable to make it even easier and quicker to attach the cleat fixed under the sole of a shoe to the pedal.

It is likewise desirable for the manufacture of the pedal to be simplified. It would be advantageous for the pedal to provide a possibility of controlling the lateral deflection of the cleat and the shoe, and a possibility of adjusting the elastic means.

According to the invention, a safety cycle pedal of the type defined above is one wherein:
- the front hoop is articulated about a second hoop spindle which is situated below the mid-plane of the pedal passing through the geometric axis of the pedal, on the side opposite to the front attachment bar, elastic means urging the front hoop toward a rest position,
- and the front upper part of the pedal body is limited by a face inclined downward toward the front allowing a greater angular range for clicking in.

The inclination of this front face relative to the mid-plane of the pedal may be about 40°.

The cycle pedal is preferably double-sided, that is to say equipped with hoops and attachment means on each of its two faces, and the front hoop of one face may be integral with the rear hoop of the other face, the two hoops forming a substantially rectangular frame.

The pedal may comprise, at the rear of the body, a kind of cap or boss against which the rear hoop butts in the rest position, this cap being provided to guide the sole of a shoe equipped with a tunnel.

Each front hoop may comprise at least one lateral stop provided in order to limit the freedom of transverse movement of a cleat fixed under a shoe.

Each front hoop may additionally comprise at least one lug projecting toward the inside of the hoop from a leg which is substantially orthogonal to the bar. Each of the legs of a hoop preferably comprises such a lug.

The elastic return means of a hoop may comprise two separate torsion springs with windings whose axes are aligned, one end of a winding bearing against a lug of a hoop and the other end bearing against a bearing piece made of a material harder than that of the pedal body.

The bearing piece may be formed by an adjusting rod mounted to rotate in the pedal body and comprising planar faces situated at different distances from the geometric axis of rotation of the rod.

Apart from the provisions set out hereinabove, the invention consists of a number of other provisions which will be dealt with more explicitly hereinafter by way of an example of embodiment described in detail with reference to the appended drawings, but this in no way implies any limitation.

Figure 9:
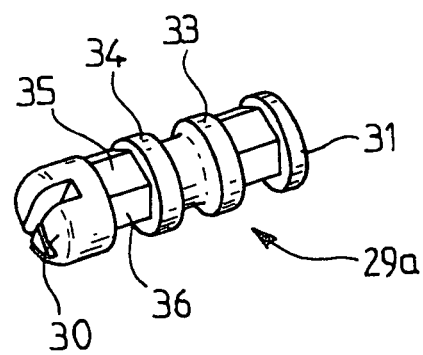

FIG. 9, finally, is a larger-scale perspective view of the adjusting rod.

Figure 1:
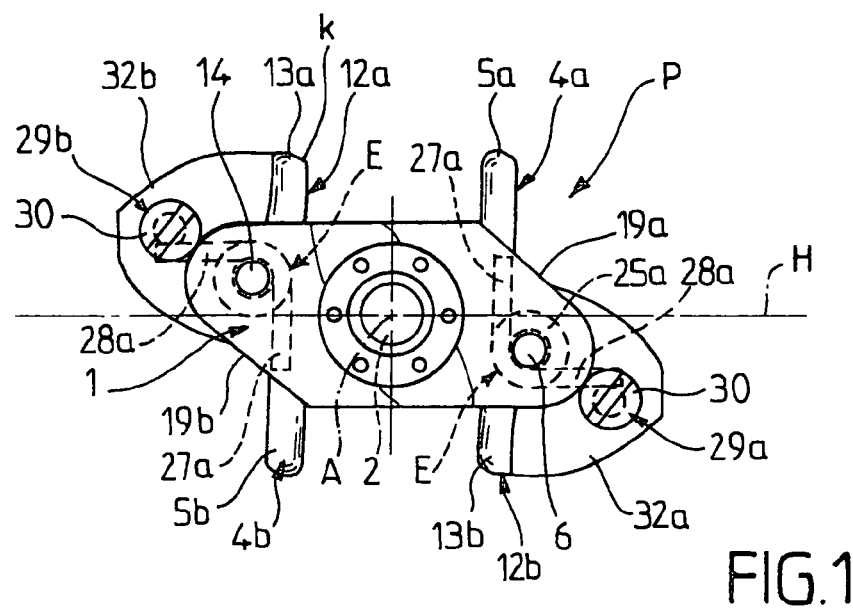
FIG. 1 is a side view of a safety cycle pedal according to the invention.
Figure 2:
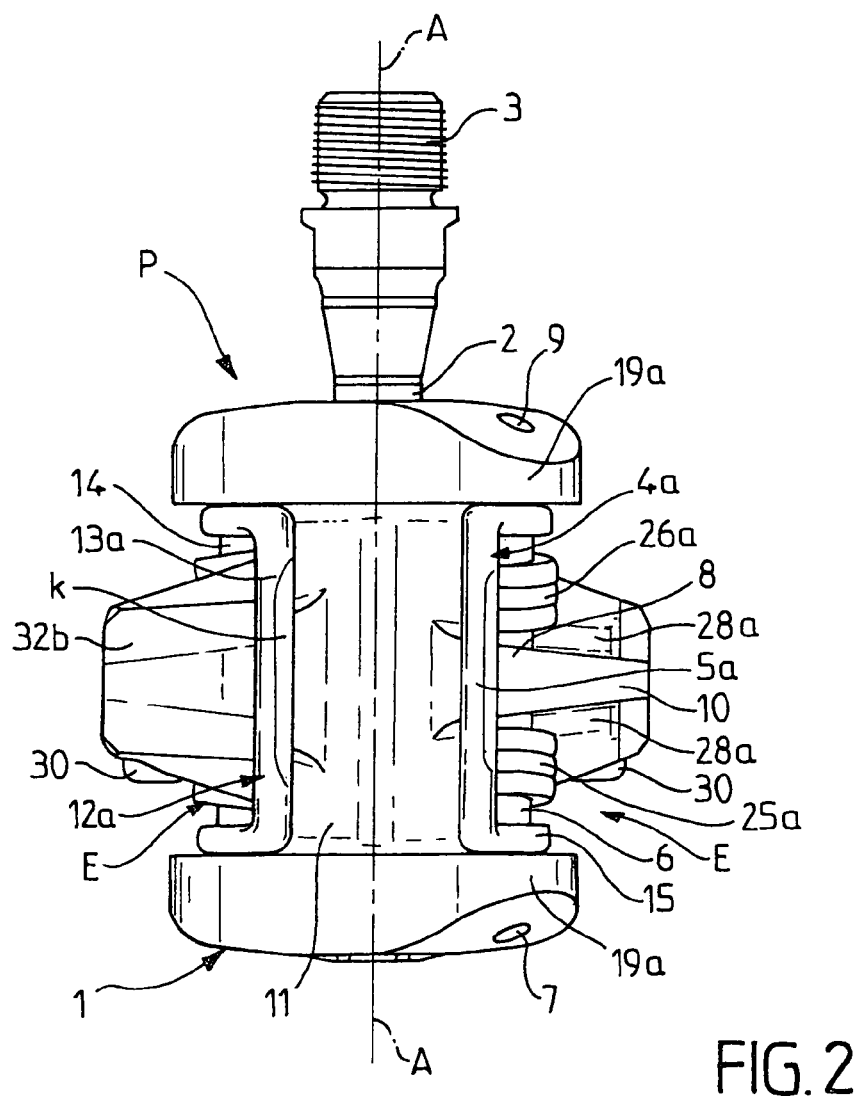
FIG. 2 is a plan view of the pedal of FIG. 1.
Figure 3:
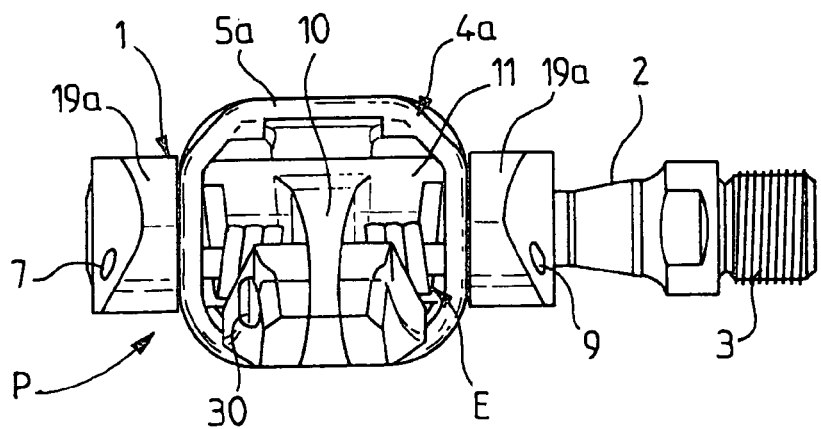
FIG. 3 is a view from the right with respect to FIG. 1.

With reference to FIGS. 1 to 3, there can be seen a safety cycle pedal P comprising a body 1 mounted to rotate about a pedal spindle 2. The end 3 of the spindle 2 remote from the pedal comprises an external thread enabling the spindle 2 to be screwed onto the end of a pedal crank (not shown).

The pedal shown in FIGS. 1 to 3 is a right-hand pedal. The direction of forward movement of a bicycle equipped with this pedal corresponds to a movement from the left to the right in FIGS. 1 and 2. In these conditions, the "front" of the pedal P in FIGS. 1 and 2 consists of the part situated on the right of the geometric axis A of the pedal, whereas the "rear" part is situated on the left of this axis. It will also be considered that the normal position of the pedal is that depicted in FIG. 1, in respect of which the mid-plane H of the pedal body, passing through the geometric axis A and parallel to the upper bearing face, is substantially horizontal.

The pedal comprises a front hoop 4a with an attachment bar 5a situated in front of the pedal spindle 2, the hoop 4a being articulated about a hoop spindle 6 mounted in bearings 7, 8 and 9 of the pedal body. The bearings 7 and 9 are provided on the outer edge and the inner edge of the pedal body, whereas the bearing 8 is situated midway across the width of the pedal body in a part 10 projecting toward the front from the core 11 of the pedal body. The attachment bar 5*a* is substantially parallel to the pedal axis A.

A rear hoop 12*a* comprising an attachment bar 13*a*, situated behind the pedal axis A and substantially parallel to this axis, is articulated about a hoop spindle 14 mounted in bearings of the pedal body which are similar to the bearings 7, 8 and 9.

The hoops 4*a*, 12*a* of the pedal are arranged between the geometric axis A of the pedal and the articulation spindles 6 or 14 for these hoops.

The pedal is preferably a double-sided pedal which is symmetrical with respect to the geometric axis of rotation A such that the hoops 4*b* and 12*b* found underneath the pedal according to FIG. 1 respectively become the front hoop and rear hoop when the pedal has turned through 180° about the axis A.

Figure 8:
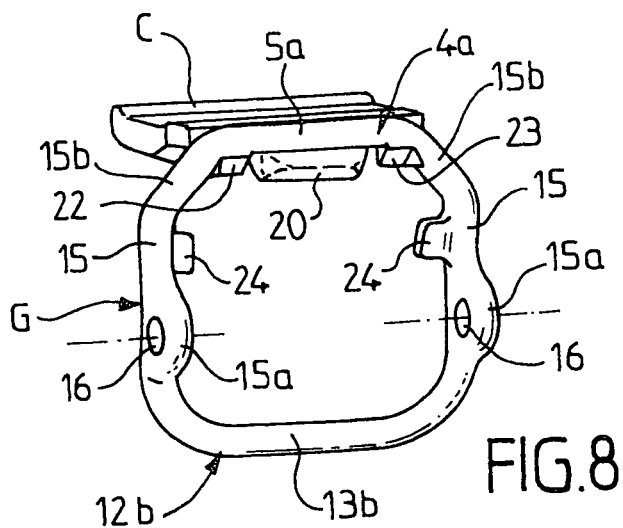
FIG. 8 is a perspective view of a front hoop and a rear hoop forming an integral frame.

Advantageously, as illustrated in FIG. 8, the front hoop 4*a* and rear hoop 12*b* form one and the same single piece constituting a substantially rectangular frame G. Two legs 15 of this piece, which are substantially orthogonal to the bars 5*a*, 13*b*, comprise an area 15*a* in the form of an arc of a circle in a plane orthogonal to the center plane of the frame G; a hole 16 is respectively provided in each area 15*a* for the passage of the articulation spindle 6.

Elastic means E, described in more detail later in the text, urge each hoop 4*a*, 12*a* toward a rest position in which the mid-plane of the hoop is substantially orthogonal to the mid-plane H of the pedal, as illustrated in FIG. 1.

Figure 6:
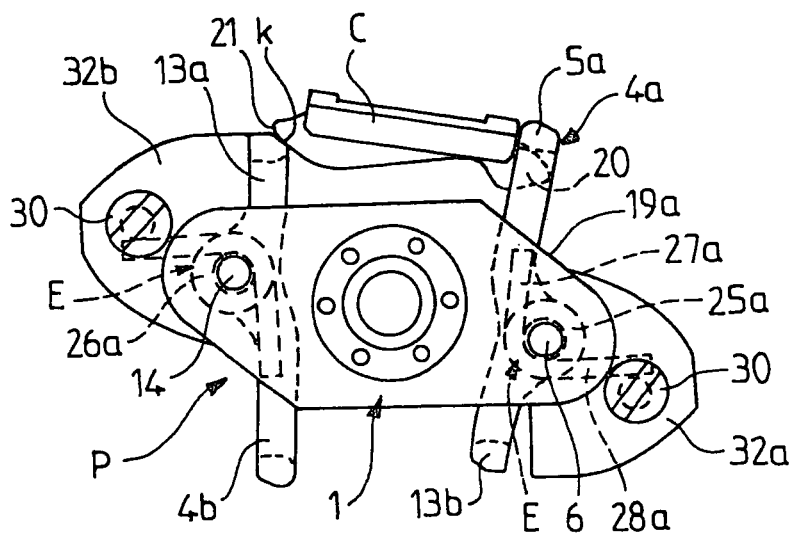
FIG. 6 is a partial elevation depicting the opening of the hoops.
Figure 7:
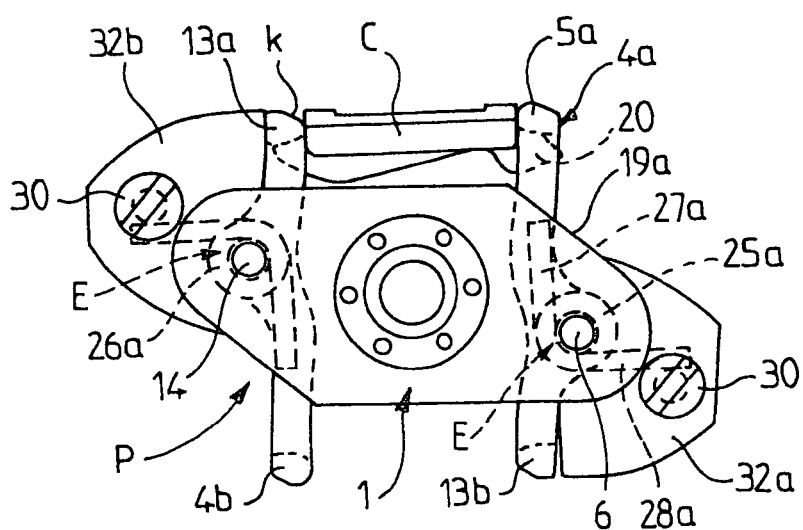
FIG. 7 shows, similarly to FIG. 6, the pedal with the interlocked cleat.

The attachment bars 5*a*, 13*a* are situated above the pedal body 1 and can be moved apart, as illustrated in FIG. 6, by rotation of at least one hoop 4*a* to allow the passage and attachment of a cleat C fixed under a sole S of a cycle shoe in a housing or tunnel 17 of the sole, at least one edge of which is limited by a projection forming a stud 18.

The thickness of the stud 18 is greater than that of the cleat C. The stud or studs such as 18 make it easier for a cyclist to walk on hard ground because they prevent the cleat C, in particular made of metal, from being in contact with the ground. However, the presence of such studs or projections on either side of the cleat C complicates the attachment of the cleat to the pedal. Up until now, the cyclist has been required to present the sole S and the cleat C relative to the pedal P at an angle within a relatively small angular range.

In order to increase this angular attachment range, according to the invention the articulation spindle 6 of the front hoop is situated below the mid-plane H of the pedal. The spindle 6 is therefore located on the side opposite to the bar 5*a* relative to this plane H. Furthermore, the front upper part of the pedal body is limited by a face 19*a* inclined downward toward the front. This inclination of the face 19*a* is made possible by lowering the spindle 6, which makes it possible to retain sufficient material around the bearings through which the spindle 6 passes.

The angle of inclination β (FIG. 4) of the face 19*a* relative to the mid-plane H of the pedal is advantageously around 40°. The angular range α for clicking in may reach 25°. The upper bearing face Ha of the pedal body, parallel to the plane H, forms the same angle β with the face 19*a*. The two positions corresponding to the limits of the angular range α for clicking in are illustrated in FIGS. 4 and 5.

Figure 4:
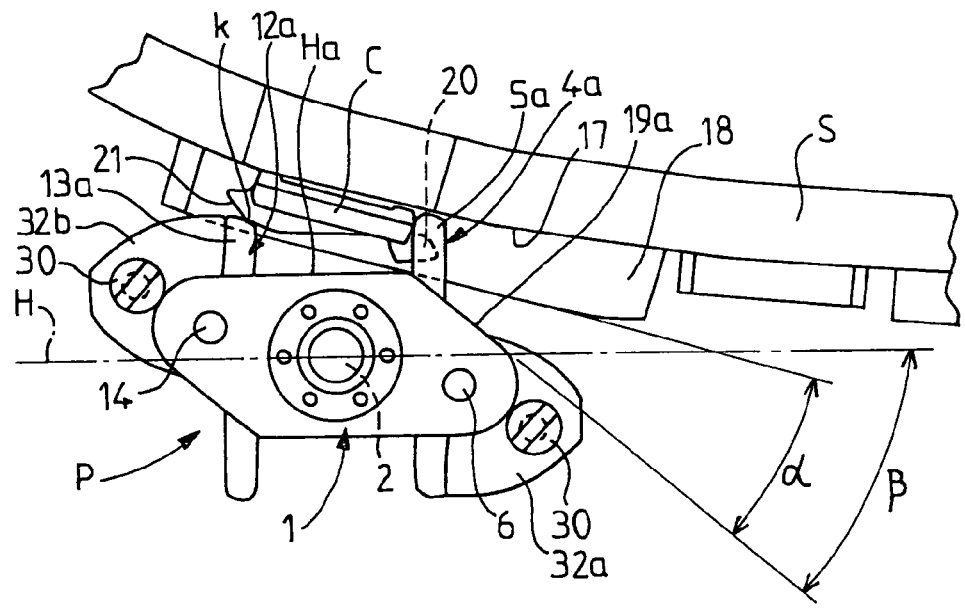
FIG. 4 is a side view of the start of the interlocking phase of a cleat at a first angle.

FIG. 4 illustrates the case of minimum inclination of the sole S relative to the plane H allowing attachment. The cleat C, by way of its front catch 20, is engaged under the front bar 5*a*, whereas the rear part 21 of the cleat bears against the rear bar 13*a*.

Figure 5:
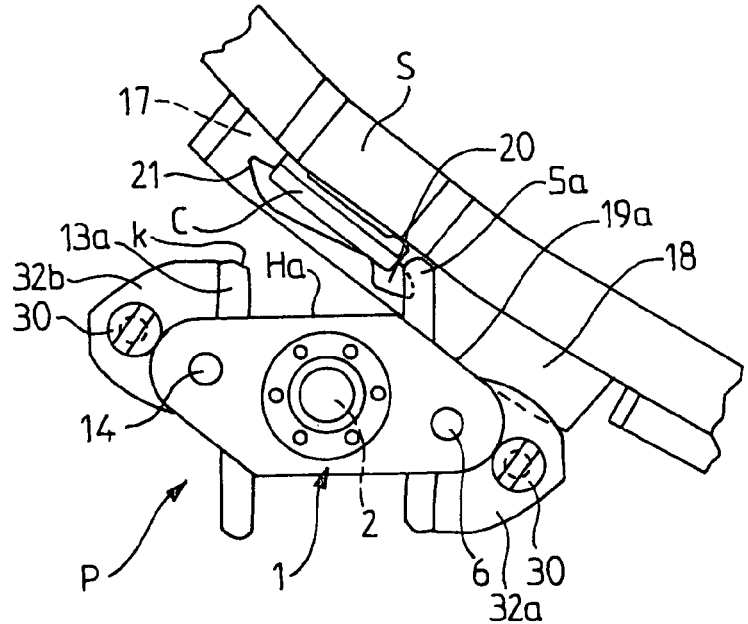
FIG. 5 shows, similarly to FIG. 4, the start of the interlocking phase at another angle.

FIG. 5 illustrates the maximum angle of inclination of the sole S relative to the mid-plane H, again allowing attachment of the cleat C. In this position, the stud 18 bears against the inclined face 19*a* of the front part of the pedal and the catch 20 of the cleat is engaged under the bar 5*a*. The rear part 21 of the cleat C is at a distance above the bar 13*a*. The thrust exerted by the catch 20 on the bar 5*a* allows the pedal P to be turned relative to the sole S in the direction which causes the rear part 21 of the cleat to be attached under the bar 13*a*.

In the case of a pedal fitted with attachment bars 5*a*, 13*a* on one face only, namely the upper face according to FIG. 1, the articulation spindle 14 for the rear hoop could be at the level of the plane H.

However, in the case of a pedal comprising attachment means on its two faces (double-sided pedal), the articulation spindle 14 for the rear hoop 13*a* is situated above the plane H and is symmetrical with the spindle 6 relative to the geometric axis A of the pedal. Consequently, when the pedal occupies a position turned through 180° relative to that of FIG. 1, the spindle 14, which serves as articulation spindle for the hoop 4*b*, which has become the front hoop, is situated below the plane H. Furthermore, the lower rear part of the pedal P in the position of FIG. 1 is limited by an inclined face 19*b*, which is symmetrical with the face 19*a* relative to the axis A.

As can be seen in FIG. 8, the upper bar 5*a* is connected, at its ends, to the legs 15 of the frame by inclined parts 15*b*.

A stop 22, 23 is advantageously provided at each end of the bar 5*a* in order to limit the possible lateral deflection of the catch 20 of the cleat C engaged under this bar 5*a*. This lateral deflection is adjusted to an optimum value, for example ±2.5 mm on either side of a mean position, by giving the stops 22, 23 a suitable dimension in a direction parallel to the bar 5*a*.

Each leg 15, which is substantially orthogonal to the bar 5*a*, comprises a lug 24 projecting to the inside of the frame G substantially halfway between the hole 16 and the upper bar 5*a*.

The elastic return means E for a hoop such as 4*a* comprise two separate torsion springs 25*a*, 26*a* (FIG. 2) each comprising a winding through which the hoop spindle 6 passes. The springs 25*a*, 26*a* are arranged on either side of the projecting mid-part 10 of the pedal body, within the hoop 4*a*.

The end of a winding that is remote from the central part 10 is terminated by a straight segment such as 27*a*, forming a tab, which butts against the adjacent lug 24 of the hoop. The other end of the winding, adjacent to the central part 10, is terminated by a straight segment 28*a* which bears against a bearing piece 29*a* made of a material harder than that of the pedal body 1.

The pedal body 1 may be made of plastic or light alloy, or another material whose hardness would be sufficient to prevent the bearing of the segment 28*a* from causing a mark or even damaging the material. The piece 29*a*, made of steel for example, is sufficiently hard to withstand, without being spoiled, the segment 28*a* bearing against it.

The piece 29*a* is advantageously formed by an adjusting rod, clearly visible in FIG. 9, comprising a head 30 fitted with a diametral slot allowing this piece to be turned by means of a tool. The other end is formed by a coaxial disk 31 mounted to rotate in a circular housing provided in a part of the body 1 forming a kind of cap 32*a* or boss. Two other disks 33, 34, forming circular bearing surfaces, are provided in the mid-region in the axial direction of the piece 29*a* in order to be accommodated within a cylindrical housing of the same diameter made in the mid-part 10 of the body 1. The piece 29*a* is guided in rotation about its geometric axis by the disks 31, 33, 34 and the head 30.

Provided in the axial direction, on the one hand between the head 30 and the disk 34 and, on the other hand, between the disks 33 and 31, are planar bearing faces such as 35, 36, which are parallel to the geometric axis of the piece 29a. The radial distance of the faces such as 35, 36 from this axis varies from one face to another. The end segment 28a of a spring bears against one of the faces such as 35, 36. The angular position of the piece 29a is maintained by the pressure exerted on the bearing face by the segment 28a of the spring.

Turning the piece 29a by means of a tool fitted into the slot in the head 30 makes it possible to change the bearing face 35 or 36 of the segment 28a of the spring and thereby modify the tension of the spring.

The frame G forming an integral piece is advantageously made of steel. The cross section of the bars 5a, 13b and 5b, 13a may be square or rectangular, as opposed to being circular in the case of a metal wire. The upper front edge of the rear bar 13a, 13b may have a chamfer k inclined downward toward the front. This chamfer makes it easier for the rear part 21 of the cleat to drop down.

The cap 32b or 32a situated to the rear of the body 1 has the primary function of preventing the catch of the cleat C from attaching to the rear hoop during clicking in. This cap 32b or 32a also serves as a support for the rear hoop 12a, 12b in its rest position.

Against this background, the way in which the pedal operates is as follows.

When the cyclist, equipped with a shoe with sole S and cleat C (FIGS. 4 to 7), wishes to attach the cleat and the sole to the pedal, he merely needs to present the sole S relative to the mid-plane H at an angle within the angular range α for clicking in order to engage the catch 20 of the cleat under the bar 5a of the front hoop. By exerting a pressure by the inclined rear part 21 of the cleat on the bar 13a of the rear hoop, the cyclist causes the bars 5a and 13a to be moved apart, as illustrated in FIG. 6, by rotation of the front hoop 4a about the spindle 6. Although, in the example in question, the rear hoop 13a is in abutment against the boss 32b, there may be provided a possibility of moving the bar 13a backward by rotation of the hoop about the spindle 14.

The inclined face 19a of the front of the pedal constitutes a zone on which the blocks 18 of the sole may slide during interlocking.

As the angular sector α allowing attachment has been increased, this in particular being about 25°, clicking in, that is to say attachment of the cleat C to the pedal, is made easier and is quicker.

The shoe is released in a conventional manner by a twisting movement of the foot which enables the rear part of the cleat C to be freed from its attachment to the rear bar 13a, the front hoop being pushed back.

When the shoe is attached to the pedal, the internal stops 22, 23 (FIG. 8) of the hoop 4a precisely limit the lateral deflection of the catch 20 of the cleat, and therefore of the shoe. In the case of the cleat catch 20 having a width of 11 mm, the distance between the opposing faces of the stops 22, 23 may be 16 mm, which gives a constant lateral freedom of ±2.5 mm, which is independent of the width of the housing 17 or tunnel of the shoe in which the cleat C is fixed.

The construction of the pedal becomes simplified by the frame G combining a rear hoop and a front hoop. It is possible to adjust the preload of the springs such as 25a, 26a with the piece 29a.

The invention claimed is:

1. A safety cycle pedal including a pedal body mounted to rotate about a pedal spindle, said safety cycle pedal comprising:
   a first rear hoop comprising a first rear attachment bar situated behind the pedal spindle and substantially parallel to the pedal spindle, the first rear hoop being articulated about a first hoop spindle mounted in bearings of the pedal body,
   a first front hoop comprising a first front attachment bar situated in front of the pedal spindle and substantially parallel to the pedal spindle, the first front hoop being articulated about a second hoop spindle, and the first front hoop comprising at least one lug projecting to an inside of the first front hoop from a leg which is substantially orthogonal to the first front attachment bar, said at least one lug projecting substantially halfway between a hole for a passage of the second hoop spindle and the first front attachment bar,
   elastic means urging the first rear hoop and the first front hoop toward a rest position in which a mid-plane of the first front hoop and a mid-plane of the first rear hoop are substantially orthogonal to a mid-plane of the pedal passing through a geometric axis of the pedal, wherein:
   the front and rear attachment bars are situated above the pedal body and are able to be moved apart in order to allow the passage and attachment of a cleat fixed under a sole of a cycle shoe in a housing of the sole, at least one edge of which is limited by a stud whose thickness is greater than a thickness of the cleat;
   the second hoop spindle is situated below said mid-plane of the pedal, on an opposite side to the front attachment bar; and
   a front upper part of the pedal body is limited by a front face inclined downward toward a front of the pedal, allowing an angular range for clicking the cleat in the pedal.

2. The assembly as claimed in claim 1, wherein the inclination of the front face relative to the mid-plane of the pedal is 40°, said front face constituting a zone on which blocks of the sole are configured to slide during interlocking.

3. The assembly as claimed in claim 1, wherein the angular range for clicking the cleat in the pedal is a 25° range.

4. The assembly as claimed in claim 1, wherein material is retained around bearings through which the second hoop spindle passes.

5. The assembly of claim 1, further comprising:
   a second rear hoop integral with the first front hoop so as to form a rectangular frame, said second rear hoop comprising a second rear attachment bar; and
   a second front hoop integral with the first rear hoop so as to form a rectangular frame, said second front hoop comprising a second front attachment bar, wherein said first front hoop and said first rear hoop are located at a top face of the pedal, and wherein the second front hoop and the second rear hoop are located at a bottom face of the pedal.

6. The assembly as claimed in claim 1, comprising, to the rear of the body, a cap provided for guiding the sole of a shoe fitted with a tunnel, wherein the rear hoop bears against the cap in a rest position.

7. The assembly as claimed in claim 1, wherein said first front hoop comprises at least one lateral stop limiting the freedom of transverse displacement of a cleat fixed under a shoe.

8. A safety cycle pedal including a pedal body mounted to rotate about a pedal spindle, said safety cycle pedal comprising:
- a first rear hoop comprising a first rear attachment bar situated behind the pedal spindle and substantially parallel to the pedal spindle, the first rear hoop being articulated about a first hoop spindle mounted in bearings of the pedal body,
- a first front hoop comprising a first front attachment bar situated in front of the pedal spindle and substantially parallel to the pedal spindle, said first front hoop being articulated about a second hoop spindle, and said first front hoop comprising legs substantially orthogonal to said first front attachment bar, each of said legs comprising a lug projecting to an inside of the first front hoop, said lug projecting substantially halfway between a hole for a passage of the second hoop spindle and the first front attachment bar,
- elastic means urging the first rear hoop and the first front hoop toward a rest position in which a mid-plane of the first front hoop and a mid-plane of the first rear hoop are substantially orthogonal to a mid-plane of the pedal passing through a geometric axis of the pedal, wherein:
  - the front and rear attachment bars are situated above the pedal body and are able to be moved apart in order to allow the passage and attachment of a cleat fixed under a sole of a cycle shoe in a housing of the sole, at least one edge of which is limited by a stud whose thickness is greater than a thickness of the cleat;
  - the second hoop spindle is situated below said mid-plane of the pedal, on an opposite side to the front attachment bar; and
- a front upper part of the pedal body is limited by a front face inclined downward toward a front of the pedal, allowing an angular range for clicking the cleat in the pedal.

9. A safety cycle pedal including a pedal body mounted to rotate about a pedal spindle, said safety cycle pedal comprising:
- a first rear hoop comprising a first rear attachment bar situated behind the pedal spindle and substantially parallel to the pedal spindle, the first rear hoop being articulated about a first hoop spindle mounted in bearings of the pedal body,
- a first front hoop comprising a first front attachment bar situated in front of the pedal spindle and substantially parallel to the pedal spindle, the first front hoop being articulated about a second hoop spindle, the first front hoop comprising at least one lug projecting to an inside of the first front hoop from a leg which is substantially orthogonal to the first front attachment bar,
- elastic means comprising two separate torsion springs with windings whose axes are aligned, one end of said windings bearing against said at least one lug and another end of said windings bearing against a bearing piece made of a material harder than that of the pedal body, said elastic means urging the first rear hoop and the first front hoop toward a rest position in which a mid-plane of the first front hoop and a mid-plane of the first rear hoop are substantially orthogonal to a mid-plane of the pedal passing through a geometric axis of the pedal, wherein:
  - the front and rear attachment bars are situated above the pedal body and are able to be moved apart in order to allow the passage and attachment of a cleat fixed under a sole of a cycle shoe in a housing of the sole, at least one edge of which is limited by a stud whose thickness is greater than a thickness of the cleat;
  - the second hoop spindle is situated below said mid-plane of the pedal, on an opposite side to the front attachment bar; and
- a front upper part of the pedal body is limited by a front face inclined downward toward a front of the pedal, allowing an angular range for clicking the cleat in the pedal.

10. The cycle pedal as claimed in claim 9, wherein the bearing piece is formed by an adjusting rod mounted to rotate in the pedal body and comprising planar faces situated at different distances from the geometric axis of rotation of the rod.

* * * * *